Patented Dec. 19, 1944

2,365,264

UNITED STATES PATENT OFFICE 2,365,264

PRODUCTION OF OXYGEN-CONTAINING ORGANIC COMPOUNDS

Walter Henry Groombridge and Ronald Page, Spondon, near Derby, England, assignors to Celanese Corporation of America, a corporation of Delaware No Drawing. Application July 5, 1941, Serial No. 401,290. In Great Britain July 25, 1940

7 Claims. (Cl. 260—614)

This invention relates to the production of oxygen-containing organic compounds more particularly by treatment of olefines.

The production from olefines of oxygen-containing organic compounds by absorption of the olefines in acid reacting liquors, followed by dilution and distillation of the absorption product so as to obtain a hydration product of the absorbed olefines, is a process which has attracted considerable attention in recent years. An important factor determining the economic value of this process is the cost of re-concentrating the acid absorption liquid obtained after the recovery of the olefine hydration product. Industrially, the most important acid reacting liquor is sulphuric acid, and while this acid can be concentrated to somewhat more than 80% strength without great difficulty concentration above this figure, and especially to a strength of 95% or more, is an expensive operation. For the hydration of ethylene however, the use of sulphuric acid in a concentration above 80%, and especially at concentrations of 92–95%, is necessary in order to secure a really rapid absorption. Consequently, the establishment of an industrial process on these lines involves consideration of the economics of absorbing in an acid of about 80% concentration at a relatively low rate with consequent expenditure of time and the use of a fairly large quantity of this acid as opposed to the use of a much more concentrated acid which, while affording rapid absorption and necessitating the use of a smaller bulk of acid, at the same time involves a more expensive re-concentration process.

Where the olefine material available consists of a mixture of olefines, e. g. ethylene and propylene, the difficulties referred to above are added to by the fact that while, for technical efficiency, it is necessary to ensure that all the olefines shall be absorbed without destruction by the formation of tars or polymers, it is not possible to secure this result simply by the use of a common absorption liquor. For instance, while for the absorption of ethylene the use of sulphuric acid of from 92—95% concentration provides a most satisfactory result from the point of view of rapidity of absorption the use of acid of such concentration for propylene absorption is impossible in view of its strong polymerizing action on the propylene. On the other hand, with an acid of say 75–80% concentration, propylene can be rapidly absorbed while ethylene is only slightly absorbed and to a very low degree under the same conditions. It is accordingly the practice when employing mixtures of ethylene and propylene with sulphuric acid to absorb the more reactive propylene first and then to absorb the remaining ethylene in a separate quantity of acid of a concentration more suitable for this less reactive olefine, or alternatively to separate the two olefines before attempting to form an absorption product from either. These processes suffer from the disadvantage that, unless every trace of propylene is removed from the starting materials contamination of the ethylene absorption product with tars and other polymeric products results from the decomposition of the residual propylene by the strong acid used for absorbing the ethylene.

The present invention is concerned with a method of obtaining oxygen-containing compounds from olefines of different reactivities by absorption in acid reacting liquors while avoiding the difficulties referred to above. The invention is especially concerned with the problem of utilising ethylene and propylene with the aid of sulphuric acid and will be described more particularly in this connection.

According to the invention, ethylene is absorbed in sulphuric acid of a high concentration to a degree representing substantially less than that of complete saturation of the acid with ethylene and thereafter the absorption product is diluted and propylene is absorbed therein to form an absorption product containing both ethylene and propylene esters of sulphuric acid.

The absorption of ethylene by sulphuric acid proceeds slowly at first, then more rapidly and after a time slows down again. The period of rapid absorption of ethylene corresponds roughly to the absorption of 0.3 molecule to 0.7 or somewhat more, e. g. about 0.8 molecule, per molecule of sulphuric acid and if the absorption is allowed to continue beyond this stage considerably more time must be employed to effect a unit increase in olefine absorption product than is necessary during the period of rapid absorption. Moreover, during this latter part of the absorption a considerable quantity of di-ethyl sulphate appears in the absorption product and the subsequent hydrolysis of this di-ethyl sulphate and recovery of the olefine hydration product therefrom is of a more complicated nature than the hydrolysis of an absorption product consisting substantially of ethyl hydrogen sulphate. According to the preferred form of the invention the absorption of ethylene is allowed to proceed only to the stage where the rapidity of absorption begins to fall noticeably and in particular to a stage representing the absorption of about 0.8 molecule of ethylene per molecule of sulphuric acid and thereafter the absorption product is diluted and employed for the absorption of propylene. The propylene is very rapidly absorbed by the ethylene absorption product and consequently the whole process is characterised by the rapid utilisation of the olefines as well as by the use of the minimum quantity of acid possible for a successful process.

By the use of a catalyst the rapidity of the absorption can be improved even further and silver and silver and copper compounds may be mentioned as being especially valuable in this connection. Such catalysts have a most marked effect during the initial stages of the absorption and overcome the slowness of the early part of the absorption completely and effect a considerable improvement during the later period of absorption, especially up to the 0.8 molecule of ethylene per molecule of sulphuric acid stage. It will thus be appreciated that the present invention takes the fullest advantage of the use of such catalysts. 1% of the weight of the sulphuric acid of silver or silver compound has been found to give excellent results, but somewhat larger quantities of copper compounds, e. g. about 4–5%, are desirable.

It is possible in cracking operations to obtain gas mixtures containing olefines including both ethylene and propylene these gases sometimes being present in small quantities only although, when the cracking operation is carried out under suitable conditions, they may form 50% or even more of the gaseous cracking products. The present invention is of great value in the treatment of such gas mixtures. Thus, by scrubbing such gases with hydrocarbon oils at quite low superatmospheric pressures, e. g. of about 5–10 atmospheres, substantially all the propylene together with a little, e. g. ⅛ to ¼, of the ethylene can be removed. The remaining gas, containining the bulk of the ethylene and substantially free from propylene, is available for use in the initial stage of the process of the invention, while the gas recovered from the hydrocarbon scrubbing oil and containing a high concentration, e. g. 70–80%, of propylene can be used for the second stage of the process, in which this propylene is substantially completely absorbed, and the residual gas, consisting largely of ethylene, can be absorbed either separately or after addition to the scrubbed gas recovered from the cracking operation.

The dilution of the ethylene absorption product is necessary in order to reduce the concentration of free acid therein to such a value as to ensure that the propylene subsequently employed will be absorbed without polymerisation. In general it is convenient to employ sulphuric acid of over 90% and especially of about 92–96% concentration for absorption to about 0.8 molecule per molecule of sulphuric acid, and to add sufficient water to reduce the concentration to say 85–90% on the assumption that no sulphuric acid has been used during the process. Actually, since some of the sulphuric acid will be in the form of ethyl hydrogen sulphate the true concentration of free acid is considerably below the values indicated. In practice it has been found satisfactory to add to an absorption product of the type referred to a quantity of water equal to about 7–10% by weight of the absorption product.

It is not necessary that the ethylene and propylene absorptions should be carried out under the same conditions. Indeed, with acid of the concentrations indicated it is usually advantageous to employ a somewhat higher temperature for the ethylene absorption than can safely be used for the propylene absorption, for instance, the ethylene absorption may be conducted at 75–85° C. and the propylene absorption at 25–35° C. Atmospheric pressure or slightly increased pressure of up to say, 5 atmospheres is sufficient to ensure rapid absorption, but higher pressures, e. g. 10–50 atmospheres, may be used if desired.

The invention is not limited to the use of sulphuric acid and may be applied also to the use of acids such as phosphoric acid and sulphonic acids including those of the benzene and naphthalene series. Furthermore, the invention may be applied to the treatment of other olefines besides ethylene and propylene, for instance to the treatment of mixtures of the butylenes or of one or more of the butylenes and propylene and/or ethylene, the least reactive olefine being absorbed first and the absorption product, after suitable dilution being used to absorb more reactive olefines. In such cases, the concentration of acid employed will of course be chosen according to the olefines treated, for example, sulfuric acid of 60–70% initial concentration or even lower, down to about 50%, may be employed. Moreover, more than two olefines may be successively absorbed with suitable dilution of the product of each absorption.

The alkyl sulphates or other esters forming the absorption product produced by process of the invention may be subjected to any desired treatment for the recovery of the olefine derivative absorbed therein. Thus the absorption product may be diluted with water and heated so as to hydrolyse the alkyl esters and the product distilled to recover alcohols and/or ethers, corresponding to the olefines initially treated, e. g. ethyl alcohol, diethyl ether and isopropyl alcohol, this operation being conducted continuously if desired, for instance by feeding the absorption product to a column in which it is subjected to hydrolysis and distillation. The process may be operated so as to produce as a hydration product a mixture of alcohols, e. g. ethyl and iso-propyl alcohols, which can be utilised without separation for the manufacture of other organic compounds e. g. for the manufacture of acetaldehyde and acetone by oxidation or dehydrogenation. Alternatively absorption liquors may be employed for the production of esters of organic acids, for instance of acetic or other lower fatty acids, by subjecting the organic acid to reaction with the absorption product and distilling off the organic acid esters produced.

The following example illustrates the invention as applied to the absorption of ethylene and propylene in sulphuric acid.

*Example*

Pure ethylene, or ethylene in the form of a mixture of about 50% concentration with paraffin hydrocarbons, is passed into a column of sulphuric acid of 95.5% strength containing 1% silver as promoter and maintained at a temperature of about 80° C. Absorption is continued until about 0.8 molecule of ethylene per molecule of sulphuric acid has been absorbed which can be effected in about four hours. The absorption product is then diluted with about 8% by weight of water and propylene passed into the mixture at a temperature of about 30° C. The passage of the propylene is continued until between 0.5 and 0.6 molecule of propylene per molecule of sulphuric acid have been absorbed, an operation which may take a matter of two hours.

The product is then diluted with water and the mixture heated to hydrolyse the ethyl and isopropyl hydrogen sulphates and to distil off the alcohols produced.

Having described our invention, what we desire to secure by Letters Patent is:

1. Process for the production of oxygen-containing organic compounds from olefines, which comprises absorbing ethylene substantially free from higher olefines in sulphuric acid of at least 90% concentration until about 0.8 molecule of ethylene per molecule of sulphuric acid have been absorbed, diluting the absorption product with 7 to 10% of its weight of water and thereafter absorbing propylene therein, said absorptions being carried out at pressures not exceeding 5 atmospheres.

2. Process according to claim 1 wherein the ethylene absorption is conducted at a temperature of 75 to 85° C. and the propylene absorption at a temperature of 25 to 35° C.

3. Process for the production of oxygen-containing organic compounds from olefines, which comprises absorbing ethylene substantially free from higher olefines in sulphuric acid of at least 90% concentration at a temperature of 75–85° C. until about 0.8 molecule of ethylene per molecule of sulphuric acid have been absorbed, diluting the absorption product with 7–10% of its weight of water, absorbing propylene therein at a temperature of 25–35° C., hydrolyzing the final absorption product, and recovering ethyl and isopropyl alcohols by distillation, said absorptions being carried out at pressures not exceeding 5 atmospheres.

4. Process according to claim 3 wherein a catalyst selected from the group consisting of silver and copper and their compounds is used to assist the absorption.

5. Method of utilizing a gaseous mixture comprising ethylene and propylene and substantially free from other olefines, which comprises subjecting said mixture to treatment with a hydrocarbon oil whereby part of said mixture is dissolved to leave an undissolved fraction rich in ethylene and substantially free from propylene, bringing said undissolved fraction into contact with an acid so as to absorb ethylene and form an ethyl ester of the acid, diluting the absorption product, recovering at least part of the dissolved gases and bringing them into contact with the diluted absorption product so as to absorb propylene and form an isopropyl ester of the acid, said absorptions being carried out at pressures not exceeding 5 atmospheres, and recovering oxygen-containing compounds from the final absorption product.

6. Method according to claim 5 wherein the olefines are absorbed in sulphuric acid.

7. Method of utilizing a gaseous mixture comprising ethylene and propylene and substantially free from other olefines, which comprises subjecting said mixture to treatment with a hydrocarbon oil whereby part of said mixture is dissolved to leave an undissolved fraction rich in ethylene and substantially free from propylene, bringing said undissolved fraction into contact with sulphuric acid of at least 90% concentration at a temperature of 75 to 85° C. until about 0.8 molecule of ethylene per molecule of sulphuric acid have been absorbed, diluting the absorption product with 7 to 10% of its weight of water, recovering at least part of the dissolved gases and bringing them into contact with the diluted absorption product at a temperature of 25 to 35° C. until about 0.5 to 0.6 molecule of propylene per molecule of the original sulphuric acid have been absorbed, said absorptions being carried out at pressures not exceeding 5 atmospheres, hydrolyzing the final absorption product, and recovering ethyl and isopropyl alcohols by distillation.

WALTER HENRY GROOMBRIDGE.
RONALD PAGE.